United States Patent [19]
Zurimendi et al.

[11] Patent Number: 4,772,308
[45] Date of Patent: Sep. 20, 1988

[54] ANTI-CAKING COMPOSITION

[75] Inventors: Jon Zurimendi; Rafael A. Bolivar C., both of Caracas, Venezuela

[73] Assignee: Intevep, S.A., Caracas, Venezuela

[21] Appl. No.: 904,612

[22] Filed: Sep. 8, 1986

[51] Int. Cl.$^4$ ............ C05G 3/00; C05C 1/02; C05C 3/00
[52] U.S. Cl. .................... 71/64.12; 71/27; 71/54; 71/57; 71/59; 71/61; 71/63
[58] Field of Search ............ 71/54, 57, 64.12, 27, 71/28, 59, 61, 63

[56] References Cited
U.S. PATENT DOCUMENTS
3,660,070  5/1972  Maruta et al. ............ 71/64.12 X Primary Examiner—Ferris H. Lander
Attorney, Agent, or Firm—Bachman & LaPointe

[57] ABSTRACT

Anti-caking composition for nitrogen-containing material consisting essentially of ammonium salts useful as an ingredient of fertilizer and normally posing a problem with respect to caking. The composition includes at least one sulfate anti-caking agent such as sodium alkyl sulfates, potassium alkyl sulfates or monoethanolammonium alkyl sulfate, diethanolammonium alkyl sulfate and triethanolammonium alkyl sulfate.

4 Claims, No Drawings

ANTI-CAKING COMPOSITION

BACKGROUND OF THE INVENTION

Caking of nitrogen-containing materials consisting essentially of ammonium salts useful as an ingredient of fertilizer poses a serious problem in the art. Caking makes it difficult to handle the materials in bulk form at the factory and also significantly interferes with the application of the fertilizer by the final user. Thus, for example, bagged fertilizer which has been compressed requires additional handling in order to be put into commercially acceptable form.

This caking may be caused by, for example, the formation of crystalline bridges according to which solid connections are formed at the points of contact among the granules. Alternatively, there may be capillary adhesion or bonding between the granules with a significant force often being necessary to break this adhesion or bonding. Naturally, the cohesive forces will vary based on storage conditions and other variables; however, in all cases the caking presents a serious problem which has long sought effective solution.

Several methods have been proposed to overcome this problem which generally involve the use of additives to the fertilizer composition. Typical additives include the use of finely divided powders which must cover the fertilizer substantially uniformly such as for example talc, kaolin and diatomaceous earth. Alternatively, surfactants are frequently used such as non-ionic surfactants, as the polyoxylenes, the anionic surfactants, for example, the alkyl-aryl-sulfonates and in particular the sulfonates derived from benzene and naphthalene. Alternatively, cationic surfactants have been used, especially the amines derived from long chain fatty acids. These additives form a hydrophobic film around the fertilizer granules and simultaneously reduce the surface tension of the intergranular solution, lower the angle of contact and thereby exert a beneficial effect on the caking problem. Further additives include compounds that also tend to form a hydrophobic film around the fertilizer granules such as paraffin wax, polyolefin wax and mineral oils. However, it has been found that compositions used heretofore are not entirely effective in eliminating the caking problem. Moreover, many of these additives are not desirable in the fertilizer composition, others tend to be expensive and require relatively large amounts thereof.

Accordingly, it is a principal object of the present invention to provide an anti-caking composition that flows freely and resists caking even on prolonged storage.

It is a further object of the present invention to provide an anti-caking composition as aforesaid for use with a nitrogen-containing material consisting essentially of ammonium salts useful as an ingredient of fertilizer and normally posing a problem with caking, especially ammonium sulfate.

It is a still further object of the present invention to provide an anti-caking composition as aforesaid which utilizes a relatively inexpensive additive in relatively small amounts and which is easy and economical to use on a commercial scale.

Further objects and advantages of the present invention will appear hereinbelow.

SUMMARY OF THE INVENTION

In accordance with the present invention, the foregoing objects and advantages of the present invention will be readily obtained and an anti-caking composition provided that flows freely and resists caking even on prolonged storage.

The present invention comprises: a nitrogen-containing material consisting essentially of ammonium salts useful as an ingredient of fertilizer and normally posing a problem with caking; and in admixture therewith at least one sulfate anti-caking agent of a nitrogen-containing material in an amount sufficient to reduce the normal caking tendency thereof, said sulfate anti-caking agent having the formula:

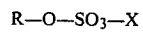

wherein R is an alkyl group containing from 8 to 20 carbon atoms and X is selected from the group consisting of
  sodium,
  potassium,
  ammonium, and
  $NH_{4-n}(CH_2-CH_2OH)_n$,
wherein n is an integer from 1 to 3.

The composition of the present invention has been found to be surprisingly anti-caking. In addition, the composition is easy and economical to prepare on a commercial scale. Moreover, the additive of the present invention has no adverse effects on the base composition and is effective in small amounts even after long periods of storage.

DETAILED DESCRIPTION

The composition of the present invention is easily prepared by admixing the anti-caking agent with the basic nitrogen-containing material consisting essentially of ammonium salts useful as an ingredient of fertilizer. Any method of admixing the materials may be readily utilized as long as an intimate admixture is obtained. Preferably, for example one can simply introduce the additive in the desired amount into a vibrator containing the fertilizer component followed by agitation of the mixture in order to ensure a complete admixture of the components. Preferably a rotating drum is employed in order to ensure the intimate admixture.

The fertilizer composition found to be particularly effectively used in the anti-caking composition of the present invention is ammonium sulfate. Alternatively, other ammonium salts may effectively employed such as ammonium nitrate. Inert additives, carriers or other conventional components may be used. The fertilizer composition could include a mixture of such salts.

The anti-caking additive of the present invention may be employed in an amount from 0.005 to 5% by weight, preferably from 0.01 to 1% by weight and optimally from 0.03 to 0.1% by weight. It is a surprising finding of the present invention that the composition with such small amounts of additives exhibits effective anti-caking behavior.

As indicated hereinabove, the sulfate anti-caking agent has the formula:

wherein R and X are as defined above.

Representative anti-caking agents include a material selected from the group consisting of sodium alkyl sulfates, potassium alkyl sulfates and mixtures thereof having the following formulas:

$$R-O-SO_3-Na$$

$$R-O-SO_3-K$$

wherein R is as defined above.

Alternatively, said sulfate anti-caking agent may be an ammonium alkyl sulfate having the following formula:

$$R-O-SO_3-NH_4$$

wherein R is as defined above.

Still further, one may employ monoethanolammonium alkyl sulfate, diethanolammonium alkyl sulfate and triethanolammonium alkyl sulfate and mixtures thereof having the following formula:

$$R-O-SO_3-NH_{4-n}(CH_2-CH_2OH)_n$$

wherein R and n are as defined above.

As indicated herein above, the anti-caking material of the present invention utilizes a long chain alkyl group containing from 8 to 20 carbon atoms generally produced from linear alcohols, for example, effective alkyl groups include octyl, nonyl, decyl, undecyl, dodecyl and so forth. Particularly preferred additives are triethanolammonium dodecylsulfate prepared from lauric alcohol, sodium alkylsulfate prepared from linear fatty alcohols containing from 12-18 carbon atoms and ammonium alkylsulfate prepared from linear fatty alcohols containing from 12-18 carbon atoms.

As indicated hereinabove, the anti-caking additive of the present invention is used in small amounts and has been found to be particularly effective in such small amounts in reducing the caking behavior of the base composition. Moreover, the amounts used are low so that they are effective in preventing caking while still permitting the fertilizer composition to effectively meet the desired nitrogen analysis. Further, the conditions of mixture are not particularly critical as long as an intimate additive mixture is obtained. Thus, for example one can simply spray the additive on the base composition and thoroughly mix the materials together.

The foregoing advantages of the present invention will be apparent from a consideration of the following illustrative examples.

EXAMPLE I

Six different additives were prepared as follows:
Comparative Additive A
ethoxylated nonyl phenol wherein nonyl phenol was ethoxylated with 4 mols of ethylene oxide per mol of nonyl phenol.
Comparative Additive B
ethoxylated nonyl phenol wherein the nonyl phenol was ethoxylated with 9 mols of ethylene oxide per mol of nonyl phenol.
Comparative Additive C
a complex of admixture of anionic surfactants in the form of a light yellow clear liquid having a density at 20° C. of 1.050±0.010 and having a pH of 7.0±0.5 in a 1% distilled water solution sold under the trademark GALORYL.

Additive D
triethanolammonium dodecylsulfate prepared from lauric alcohol and utilized in a 40% aqueous solution.
Additive E
sodium alkylsulfate prepared from linear fatty alcohols having 12-18 carbon atoms and utilized in a 30% aqueous solution.
Additive F
ammonium alkylsulfate prepared from linear fatty alcohols having 12-18 carbon atoms and utilized in a 25% aqueous solution.

EXAMPLE II

The foregoing additives were intimately admixed with ammonium sulfate fertilizer by injecting the desired amount as indicated in Table I below into 300 grams of screened (mesh 10) and homogenized ammonium sulfate using a vibrator with thorough mixing of the additive and the base ammonium sulfate composition. The mixing process took 5 minutes whereupon a period of manual agitation was employed to ensure intimate admixture.

The results are reported in Table I below wherein the percentage reduction of ammonium sulfate fertilizer cake strength caused by the application of the additive is given when compared with the product having no additive. Naturally, the larger percentage reduction of fertilizer cake strength, the more anti-caking effect is obtained. In this example, the fertilizer cakes were formed from the base mixture by applying a pressure of 1.1 Kg/cm² (15.6 psi) for four days.

TABLE I

| | Percent Reduction of Ammonium Sulfate Strength | |
|---|---|---|
| | Concentration (%) | |
| Additives | 0.03 | 0.1 |
| A | 25 | 28 |
| B | 38 | 52 |
| C | 28 | 59 |
| D | 92 | 100* |
| E | 90 | 100* |
| F | 85 | 94 |

*A cake was not formed.

It can be readily seen that the additives of the present invention, namely additives D, E and F had a dramatic improvement in anti-caking behavior, indeed in a surprisingly effective way.

EXAMPLE III

Commercial size bags of ammonium sulfate fertilizer containing concentrations of 0.03 and 0.1% of the additives D, E and F were prepared in a manner after Example II. Tests were performed on the commercial size bags with the additives for periods of one and six months wherein the bags were maintained in a pile in which the bags containing the additives were placed under fifteen (15) dummy bags. As a comparison, similar ammonium sulfate bags without additives were similarly tested.

After the test period, the bags were dropped from a height of about 3 feet and the products screened. The bags containing ammonium sulfate without additives were found to have 13% and 74% respectively of lumps greater than ½ inch for one and six months of storage. These lumps were difficult to break and represented unacceptable caking behavior, especially the six month stored bags.

On the other hand, the products of the bags with the additives did not present any caking behavior and all the fertilizer was totally free flowing, even for the smaller concentration of 0.03% after six months of storage.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed:

1. A fertilizer composition that flows freely and resists caking even on prolonged storage comprising a nitrogen-containing material consisting essentially of ammonium salts useful as an ingredient of fertilizer and normally posing a problem with caking and an anti-caking agent in an amount sufficient to reduce the normal caking tendency of said nitrogen-containing material, said anti-caking agent consisting essentially of at least one sulfate having the formula:

$$R-O-SO_3-NH_{4-n}(CH_2-CH_2OH)n$$

wherein R is an alkyl group containing from 12-18 carbon atoms and wherein n is an integer from 1 to 3. consisting of
  sodium,
  potassium,
  ammonium, and 2. A composition according to claim 1 wherein said fertilizer is ammonium sulfate.

3. A composition according to claim 1 wherein said anti-caking agent is utilized in an amount from 0.005 to 5% by weight.

4. A composition according to claim 3 wherein said anti-caking agent is employed for an amount from 0.01 to 1% by weight.

* * * * *

UNITED STATES PATENT AND TRADEMARK OFFICE
CERTIFICATE OF CORRECTION

PATENT NO. : 4,772,308

DATED : September 20, 1988

INVENTOR(S) : Jon Zurimendi et al.

It is certified that error appears in the above-identified patent and that said Letters Patent is hereby corrected as shown below:

In Column 6, claim 1, delete lines 9-12, inclusive.

Signed and Sealed this

Sixteenth Day of May, 1989

Attest:

DONALD J. QUIGG

*Attesting Officer*   *Commissioner of Patents and Trademarks*